United States Patent [19]

Cannizzaro et al.

[11] 4,310,969

[45] Jan. 19, 1982

[54] PARTIAL-CORING DEVICE

[76] Inventors: Joseph Cannizzaro, 604 E. 9th St.; Laura Winston, 56 7th Ave., both of New York, N.Y. 10009

[21] Appl. No.: 245,922

[22] Filed: Mar. 20, 1981

[51] Int. Cl.³ .............................................. A47J 25/00
[52] U.S. Cl. .................................................. 30/113.1
[58] Field of Search .................. 30/113.1, 113.2, 113.3

[56] References Cited

U.S. PATENT DOCUMENTS

| 867,970 | 10/1907 | Hedborg | 30/113.1 |
|---|---|---|---|
| 1,293,351 | 2/1919 | Creasey | 30/113.1 |
| 1,639,523 | 3/1925 | Maile | 30/113.1 |
| 2,117,278 | 5/1938 | Ainsworth | 30/113.1 |
| 2,683,312 | 7/1954 | Dover | 30/302 |
| 2,990,615 | 7/1961 | Ohler | 30/113.1 |
| 3,683,892 | 8/1972 | Harris | 30/113.1 |

Primary Examiner—Stephen G. Kunin
Assistant Examiner—J. T. Zatarga
Attorney, Agent, or Firm—William T. Hough

[57] ABSTRACT

In a preferred embodiment, a cylindrically shaped coring device is provided with an axially-slidable side member that alternately ejects and retracts a core-slicing or cutting structure removable of a portion of the core of a fruit, and provided with another axially-slidable ejector member.

13 Claims, 6 Drawing Figures

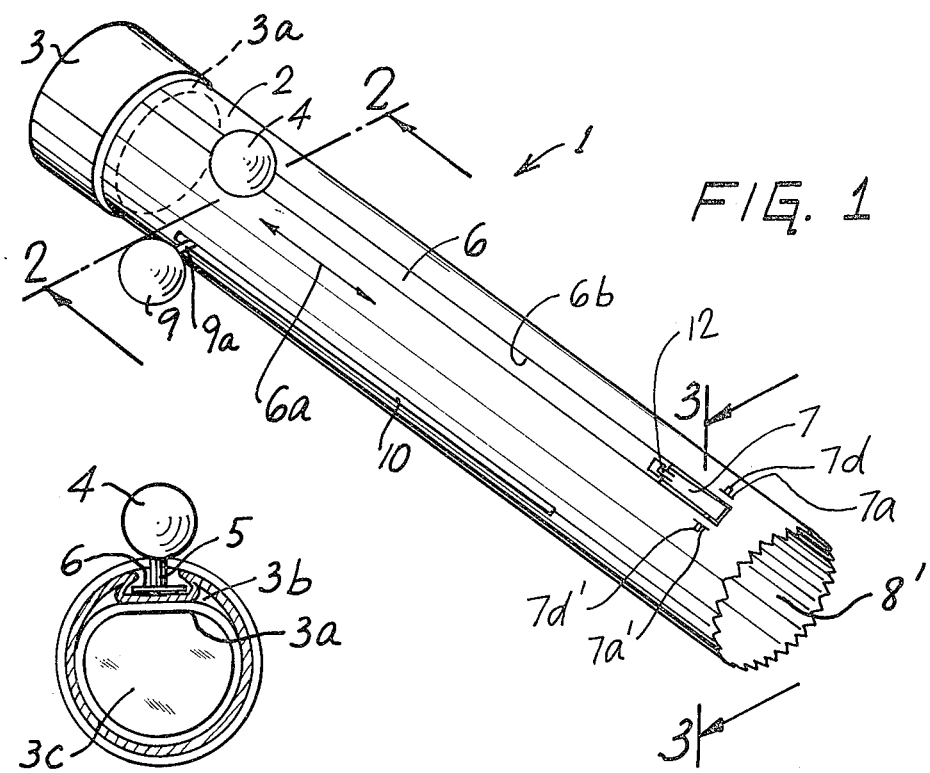
FIG. 1
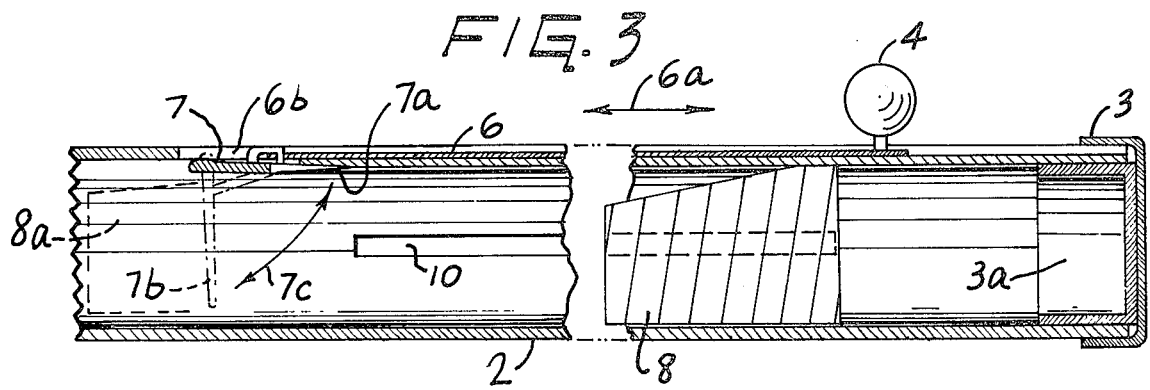
FIG. 2
FIG. 3
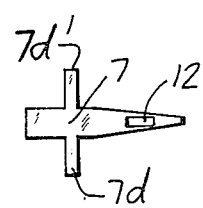
FIG. 4
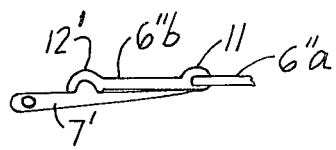
FIG. 4A
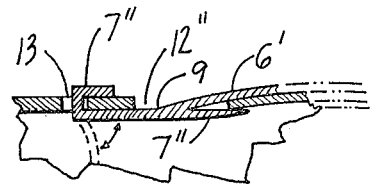
FIG. 4B

PARTIAL-CORING DEVICE

This invention relates to an improved coring device for preparing fruits for the dinner table.

BACKGROUND OF THE INVENTION

Prior to the present invention there have existed numerous coring devices, most of which are utilizable principally in the removing of the entire core of a fruit, such as an apple for example, by piercing through the entire apple. Typical are such U.S. Pat. Nos. 1,639,523 and 1,293,351, for example. The U.S. Pat. No. 2,683,312 discloses a type of corer with a cutter mounted therein, and likewise U.S. Pat. No. 2,117,278.

OBJECTS OF THE INVENTION

An object of the present invention is to obtain a partial-coring device easily utilizable to remove merely a portion of the core of the fruit, to leave a hole having a remaining portion of the core as a bottom, including compactness and ease of operation.

Another object is to obtain a novel partial coring device of improved shape for ease of handling and removing a partial core of a fruit.

Another oject is to obtain a novel coring device having an improved mechanism and ease of operation for ejecting a core from the corer after removal of the corer from the fruit, including appropriate mechanism avoiding interference with the other elements thereof.

Another object is to obtain a partial-corer having a mechanism for slicing or cutting the core while the corer is inserted within a fruit, and adapting that cutting mechanism to respond to an easily operable handle and to retract sufficiently as to permit an efficient operation of a core-ejector mechanism.

Another object is to obtain a sturdy and safe coring device easily and safely utilizable with improved efficiency of function.

Another object is to obtain a partial-coring device composed of a minimum number of simple and low-cost elements and being of a design manufacturable at a low cost as dependent upon simple and non-complicated design and structure, whereby such item may be made available commercially within the economic means of the non-rich public.

Other objects become apparent from the preceding and following disclosure.

One or more objects of the invention are obtained by the invention as described herein, and as illustrated for preferred embodiments thereof in the accompanying drawings made for purposes of improving understanding, but not limited thereto, the invention obviously including mechanical equivalents to elements disclosed.

BROAD DESCRIPTION OF THE INVENTION

Broadly the invention includes a cylindrically shaped corer having a closed end at its upper end and serrated cutting coring teeth at the other end of the cylindrical walls thereof, with a cutting blade as a part of a pivot structure mounted within an aperture of the cylindrical outer side wall, activatable by an activation mechanism. Upon moving of a side handle toward the coring or serated end, the cutting blade becomes ejected such that by then revolving the corer, the portion of the core within the corer is severed from remaining core portions of the fruit such as an apple, pear or the like. And upon retraction of the handle away from the serrated end, the cutting blade becomes retracted. The actuation mechanism includes a groove on the outer side wall of the cylindrical corer, with the groove extending axially longitudinally along the length of the cylindrical corer, with an elongated slide member mounted slidably within that elongated groove, and a handle is mounted on an upper end of the elongated slide member, and the lower end of the slide member is attached to the pivot structure in a manner such that when the handle is moved toward the serrated end of the cylindrical corer, the lower end of the slide member moves the pivot structure in an inwardly-directed pivot direction carrying the cutting blade to a position extending at-least to half of the inner diameter of the cylindrical corer's inner channel, such that a core will be totally severed when revolved 360 degrees. Upon withdrawal of the handle to an upper end, the lower end of the slide member pulls the pivot structure to its retracted state to a position substantially parallel to the cylinder's outer side wall. Thereby a further ejector mechanism for ejecting the severed core, is able to move to and past the retracted cutting blade, and to push the severed core out of the corer. The corer ejector in also conveniently mounted in an out of the way place, on the side of the corer's outer cylindrical side wall, with an ejector plug being mounted inside the corer channel space at the upper end thereof in the retracted state, and movable to the open end by a handle mounted on a neck extending through a through-space second groove or slit in the cylinder's outer side wall, with the slit extending axially of the length of the cylindrical. The plug mounted inside preferably has a specific shape such that it avoid stricking the cutting blade as it moves past the retracted blade.

Because of the slit in the cylindrical outer wall, and because of the desirable way of machine pressing the cylinder in the production of the outer side wall during production, it is desirable to strengthen the entire structure so that it will not be flimsy, and to make it durable, by mounting a cap across the top thereof of the cylinder, the cylinder cap preferably including both an inner-cap portion insertable into the channel space, and an outer-cap portion mountable around the outer upper rim portion of the cylindrical outer side wall of the corer.

In another preferred embodiment, the elongated slide member is flexible and attached either by a hinge-mechanism or by fixed attachment as by fusion, welding, bradding or the like, such that as the pivot member pivot to an inwardly ejected position by virtue of the pressure of the lower end of the elongated slide member, the elongated slide member's lower end flexes inwardly resiliently, returning to its normally straight original shape when withdrawn by moving the handle thereof toward the upper end.

In another preferred embodiment, the pivot member itself is flexible, with the base thereof mounted or secured non-pivotally on the structure of the cylinder's outer side wall, but the pivot member being resiliently flexible, bends inwardly responsive to pressure from downwardly-moving attached end of the elongated slide member, thereby resulting in the cutting blade portion of the pivot member being moved to its ejected cutting position within the channel space of the cylindrical corer; upon movement of the handle of the elongated slide member in an upward direction away from the coring end, the resilient flexible pivot member returns to its retracted position and state.

In a further preferred embodiment, both the elongated slide member and the pivot member are resiliently flexible, recognizing of course that both of the elongated slide member and the pivot member must be somewhat semi-rigid in order to perform their intended functions as above-described.

While it is possible for the various elements of the invention to be made of plastic of conventional and well-known types, or as desired, preferably the cylindrical outer side walls and pivot member and cutting blade and elongated slide member, one or more thereof, are of stainless steel metal, for sanitation purposes if none-other, but also for improved durability. Rubber or plastic or metal handles and upper cylinder cap may be utilized.

The invention may be better understood by making reference to the following Figures.

THE FIGURES

FIG. 1 illustrates a perspective view of the partial corer in a preferred embodiment of the invention.

FIG. 2 illustrates a cross-sectional view taken along line 2—2 of FIG. 1, looking toward the capped-end of the cylindrically-shaped corer.

FIG. 3 illustrates an in-part view in cross-section taken axially through the cylindrically-shaped corer as along lines 3—3 of the FIG. 1.

FIG. 4 illustrates diagrammatically the typical shape of the pivot member and cutting blade thereof of the type mounted within the outer side wall pivotally in the embodiment of FIG. 1.

FIG. 4A illustrates an alternate embodiment in which the elongated slide member includes a linked-extension at its lower end, with the lower end of the linked extension being pivotally hinged to the pivot structure, and the upper end of the linked extension being pivotally hinged to the lower body of the main elongated slidable structure.

FIG. 4B illustrates an in-part view such as that of FIG. 3, in which the pivot member is non-pivotally fixed mounted onto the cylinder's outer side wall structure, and is flexible and has the lower end of the elongated slide member fused or welded to the arm portion of the pivot structure or member.

FIG. 4 is an elevation plan view, FIG. 4A is a side and in-part view in-so-far-as the elongated side member is shown, and FIG. 4B is an in-part side cross-sectional view of the cylinder of the general type of that shown in FIG. 1, otherwise deemed identical to FIG. 1 embodiment, in side view of the pivot member and elongated slide member—both also shown however in cross-section.

DETAILED DESCRIPTION

In greater detail, FIGS. 1, 2 and 3 show a common embodiment, and also the pivot member and cutting portion or blade thereof of FIG. 4 being the same as that shown mounted pivotally in the structure of the outer side wall of the cylindrical corer of FIG. 1.

In the discussion of the disclosed embodiments, of the different Figures, for common parts identical or similar indicia will be utilized and the description not repeated for such elements for each Figure.

For the common embodiment of FIGS. 1 through 4, there is disclosed the partial-coring device 1 having its cylindrically shaped outer side wall 2, capped by a cap 3 at its upper end and the cap 3 fitting around the upper outer rim of the cylindrical outer side wall 2 and having inner cap plug 3a fitted supportingly and snugly within the upper end channel space formed within the cylindrically shaped outer side wall 2. Handle 4 is mounted on a neck shaft 5 that is mounted on the upper end of an elongated slide member 6 slidably mounted retainably within an elongated groove 6b shaped-into the outer surface of the cylindrically shaped outer side wall 2, with the elongated groove extending axially along the longitudinal axis of the cylindrically shaped outer side wall 2. The pivot member 7 has pivot arms 7d and 7d', with the pivot arms 7d and 7d' respectively mounted in the apertures 7a and 7a' in the outer side wall 2. Mounted within the channel space 8' at the upper end and slidable through the channel space to the lower open end of the cylindrically shaped outer side wall 2, is the core ejection plug or core ejecter 8 having a shaft 9a mounted on and attached thereto and extending through slit-groove 10 to handle 9. The shaft 9a is slidable within the axially extending longitudinally extending slit-groove 10. By moving the handle 9 toward the open end at the lower end of the channel space 8', the core ejecter 8 moves to the open end to eject an core contained in the channel space 8'; thereafter, movement of the handle toward the upper end of the corer causes the core ejector to move also to the upper end of the channel space as shown in FIG. 3, and FIG. 1.

By movement of the handle 4, and thereby the slide member 6, toward the lower and open end of the cylindrically shaped outer side wall 2, the lower end of the elongated slide member 6 being pivotally attached to the ring structure 12 of the pivot member 7, causes the cutting blade portion 7a to move outwardly along the movement path 7c to an ejected or extended position and state. Return of the hande 4 to the position shown in FIG. 1 causes the cutting blade portion 7a to return to the retracted position and state shown in FIG. 3. Thus, for FIGS. 1 through 4, the lower end of the elongated slide member 6 is pivotally linked to the link structure 12.

In FIG. 4A there is shown an additional link-member 6"b that is an extension, in effect, of the slidable elongated slide member 6, pivotally linked thereto at 11, as link member 6"b and elongated slide member 6"a.

In the FIGS. 1 through 4 embodiment, the lower end of the elongated slide member 6 flexibly and resiliently bends or flexes inwardly as the elongated slide member 6 is moved toward the pivot member at the open end location of the corer. It resiliently returns to its substantially straight form when moved upwardly toward the upper end of the corer 1 cylindrically shaped outer wall 2.

In FIG. 4B, an alternate arrangement and embodiment for the pivot member 7" and the elongated slide member 6' are shown in which the lower end of the elongated slide member 6' is welded or otherwise fused to the upper end portion of the blade 7'; in this embodiment also, the pivot member 7" is rigidly and immovably fastened through hole 13 to the outer side wall 2 in juxtaposition to the through-aperture 12". Thus, in this embodiment, when the handle mounted on the slide member 6', in the same manner as for the embodiment of FIG. 1, moves toward the lower end of the corer 1, the lower end of the elongated slide member flexes downwardly while simultaneously the cutting blade portion 7' becomes also flexed inwardly, both resiliently. Upon return of the handle (not shown) but the same as for the embodiment of FIGS. 1 through 4 to the upper end of the corer 1, the lower end of the elongated slide member and the cutting blade portion both return to the retracted positions and states as shown in FIG. 4B.

Normally a person would grasp the upper capped end of the corer 1 and press downwardly thereon with the lower serrated end thereof pressed-against the surface of the fruit to be cored, and twist back and forth revolvably, until the serrated end reaches the desired depth within the fruit being partially cored. At that point, the handle 4 is moved toward the serrated end of the corer in a downward direction along the path 6a shown in FIG. 3, thereby causing the cutting blade portion to move to the position 7b shown in phantom; thereafter, the corer is revolved a full effective 360 degrees in order to fully sever the cored-portion of the fruit from the body of the fruit. Thereupon the corer should be withdrawn from the fruit and the handle 4 moved to the upward end of the corer 1. Over an appropriate container for garbage, the handle 9 is moved downwardly toward the serrated end to eject the contained core portion of the fruit, and thereafter the handle 9 is returned to it upper position shown in FIGS. 1 and 3.

While this corer 1 has a special and easy use for merely partially coring a fruit, it may be obviously used also to fully core a fruit, by pressing and rotation thereof back and forth until it cores through the entire depth of the fruit. Thereafter the procedure is the same as noted-above for ejecting the core.

It is within the scope and spirit of the invention to make such variations and substitution of equivalents as would be apparent to a person of ordinary skill.

It should be additionally noted that the squared-off or blunt open-end of the cylindrically shaped wall 2 of the corer 1, prevents the serated end from slipping-off-of the fruit and from possibly gouging the worker or house wife with what in the prior art designs usually is a pointed and thus dangerous sharp end. This feature, in combination with other noted inventive aspects, is also a novel combination.

We claim:

1. A coring device comprising in combination: an elongated cylinder open at one end thereof and forming a channel space therein, an outer sidewall of the cylinder having a shape forming an elongated groove therein extending along a longitudinal axis thereof terminating in juxtaposition to said one end at a through-space opening passing through said outer side wall; an elongated slide member mounted within said elongated groove and having a handle mounted on a first end of the elongated slide member and having a second end of the elongated slide member adapted for attachment to a pivot member; and said pivot member being an elongated cutting structure mounted at a blunt end thereof onto said outer side wall in said through-space opening, said second end being mounted onto said pivot member such that movement of the elongated slide member toward the one end moves said pivot member to a position in which the elongated cutting structure extends transversely through said channel space within the cylinder and such that movement of the elongated slide member away from the one end moves the elongated cutting structure to a retracted position substantially parallel with said outer side wall.

2. A core device of claim 1, including said elongated slide member being resilient such that it flexes into said channel space when said elongated slide member is moved toward said one end, and returns to shape when the elongated slide member is moved away from said one end.

3. A coring device of claim 2, in which said pivot member is hinged to said outer side wall at said through-space opening.

4. A coring device of claim 2, in which said pivot member is resilient and immovably attached to said outer side wall in juxtaposition to said through-space opening and positioned such that a cutting end of the elongated cutting structure becomes flexed inwardly into said channel space when said elongated slide member is moved toward the one end and returns to shape when the elongated slide member is moved away from said one end.

5. A cording device of claim 4, in which said second end is fused to said pivot member.

6. A coring device of claim 2, in which said second end is fused to said pivot member.

7. A coring device of claim 1, in which said pivot member is hinged to said outer side wall at said through-space opening.

8. A coring device of claim 1, in which said pivot member is resilient and immovably attached to said outer side wall in juxtaposition to said through-space opening and positioned such that a cutting end of the elongated cutting structure becomes flexed inwardly into said channel space when said elongated slide member is moved toward the pivot member.

9. A coring device of claim 1, in which said elongated groove extends to and through an opppsite end opposite from said one end, and a mounting cap fastened onto said opposite end adapted to reinforce said outer side wall at said opposite end.

10. A coring device of claim 9, in which said mounting cap includes a plug-structure adapted to become wedged into open space at said opposite end when said cap is mounted over said outer side wall.

11. A coring device of claim 1, including an ejector plug mounted within said channel space, and in which said outer side wall has a second groove in the form of a slit extending longitudinally along said outer side wall, and a handle with a shaft extending through said slit and affixed to said ejector plug such that movement thereof axially along the slit causes the ejector plug to move axially within said channel space.

12. A coring device of claim 11, in which said one end thereof has an open-end to said channel space and for a periphery of wall structure forming said open-end, said outer side wall being of consistently the same length along said longitudinal axis such that said wall structure forming said open-end is blunted, and has serrated end-portions along said periphery.

13. A coring device of claim 1, including a cap member mounted on the outside of and around peripheral circumscribing structure defining an open end at said one end, the cap member closing that open end, and the cap member including an inner plug structure mounted snugly and supportingly within that open end in supporting contact with inner faces of the cylindrically shaped outer side wall whereby durability and stability are imparted to the elongated cylinder.

* * * * *